United States Patent [19]

Wataya

[11] Patent Number: 5,366,424
[45] Date of Patent: Nov. 22, 1994

[54] POWER TRAIN CONTROL SYSTEM FOR INTERNAL COMBUSTION ENGINE OF MOTOR VEHICLE

[75] Inventor: Seiji Wataya, Himeji, Japan

[73] Assignee: Mitsubishi Denki Kabushiki Kaisha, Tokyo, Japan

[21] Appl. No.: 50,822

[22] Filed: Apr. 22, 1993

[30] Foreign Application Priority Data

Apr. 28, 1992 [JP] Japan .................................. 4-109827

[51] Int. Cl.⁵ ........................ F02D 41/22; F02D 9/02
[52] U.S. Cl. .................................. 477/107; 477/907; 477/906; 123/336; 123/399
[58] Field of Search ........................ 123/336, 396, 399; 74/865, 866, 867; 477/107, 906, 907

[56] References Cited

U.S. PATENT DOCUMENTS

| 4,424,785 | 1/1984 | Ishida et al. ........................ 123/399 |
| 4,796,579 | 1/1989 | Wolfe et al. ........................ 123/399 |
| 4,892,071 | 1/1990 | Asayama ........................... 123/396 |

FOREIGN PATENT DOCUMENTS

| 3836914 | 5/1990 | Germany . |
| 4136650 | 5/1993 | Germany . |
| 160525 | 9/1983 | Japan ........................ 123/399 |
| 126336 | 6/1986 | Japan . |
| 80026 | 4/1988 | Japan ........................ 123/336 |
| 198746 | 8/1988 | Japan ........................ 123/399 |
| 246425 | 10/1988 | Japan ........................ 477/906 |
| 151732 | 6/1989 | Japan ........................ 123/399 |

Primary Examiner—Edward K. Look
Assistant Examiner—James A. Larson
Attorney, Agent, or Firm—Sughrue, Mion, Zinn, Macpeak & Seas

[57] ABSTRACT

A power train control system for an internal combustion engine of a motor vehicle. Opening of a throttle valve is electrically controlled in response to an accelerator pedal depression signal generated by an accelerator pedal position sensor and indicating depression depth of an accelerator pedal. A backup operation control of the engine is performed by controlling an auxiliary air flow which bypasses the throttle valve in dependence on the accelerator pedal depression signal upon occurrence of abnormality in a throttle valve control system. During the backup operation, a speed range shift pattern of an automatic transmission is changed over to a backup operation oriented pattern from a normal operation oriented pattern. The power train control system allows the motor vehicle to run even when a failure occurs in the throttle valve or a throttle control system in the fully closed state of the throttle valve.

4 Claims, 8 Drawing Sheets

POWER TRAIN CONTROL SYSTEM FOR INTERNAL COMBUSTION ENGINE OF MOTOR VEHICLE

BACKGROUND OF THE INVENTION

Field of the Invention

The present invention relates generally to a power train control system for an internal combustion engine of a motor vehicle. More particularly, the invention is concerned with a power train control system which can fail-safe the operation of an internal combustion engine (hereinafter also referred to simply as the engine) and hence that of a motor vehicle, and which can support a backup operation of the engine and hence of the motor vehicle even in the event of occurrence of a failure in the operation of an electrically controlled throttle valve for regulating the intake air flow supplied to the engine as well as an electrical control system for controlling the throttle valve.

Description of the Related Art

The intake air flow fed to a gasoline engine is conventionally regulated by a throttle valve whose opening degree is controlled by means of an accelerator pedal mechanically interlocked to the throttle valve. In recent years, there is adopted in some practical applications a so-called wired power train control in which the opening of the throttle valve is controlled by an electrical actuator in accordance with an output signal of an accelerator pedal position sensor which signal represents depth of depression of an accelerator pedal of a motor vehicle, in an effort to enhance the comfortableness in driving the motor vehicle and realize a driving at a cruising speed, while improving a disposition layout of onboard attachments.

For a better understanding of the present invention, the background technique thereof will first be described in some detail.

FIG. 6 is a block diagram showing generally and schematically a structure of a power train control system for a motor vehicle known heretofore. Referring to the figure, an internal combustion engine denoted by a reference numeral 1 is equipped with an air intake pipe 1a in which a throttle valve 2 is installed for controlling or regulating the amount of air supplied to the engine. The throttle valve 2 is mechanically coupled to an electrical throttle actuator 3 which is constituted by a DC motor, a stepping motor or the like for actuating the throttle valve 2. To this end, the throttle valve 2 is connected to the throttle actuator 3 by means of a shaft 4. A return spring 5 is wound around the shaft 4 in such orientation that the throttle valve 2 is resiliently urged toward the closed position when operation of the throttle actuator 3 is disabled. Provided in association with the throttle valve 2 is a throttle position sensor (TPS) 6 for detecting the degree of opening of the throttle valve 2. On the other hand, there is provided in association with an accelerator pedal 7 of a motor vehicle an accelerator pedal position sensor (APS) 8 which serves for detecting the degree of actuation or depression of the accelerator pedal 7. A reference numeral 9 denotes an engine rotation speed sensor for detecting the rotation speed (rpm) of the engine 1 to thereby generate an engine rotation speed signal. The output signals of the sensors 6, 8 and 9 mentioned above are inputted to a controller 10 which is designed to control operation of the throttle actuator 3 on the basis of these sensor output signals.

With the power train control system of the structure described above, the control of the throttle actuator 3 is realized through a procedure which is illustrated in a flow chart of FIG. 7. Incidentally, processings and operations such as arithmetic operations, conditional decisions and others described below by reference to FIG. 7 are executed by a micro-computer incorporated in the controller 10. However, since such micro-computer is a conventional one, description thereof is omitted, being understood that the structure as well as programming of the micro-computer can easily be implemented by those having ordinary knowledge in the art.

Now, referring to FIG. 7, in a step S71, the controller 10 or micro-computer incorporated therein fetches the output signal of the accelerator pedal position sensor 8, which signal represents a degree of depression $\alpha$ of the accelerator pedal 7. In a step S72, a desired opening degree $\theta_s$ of the throttle valve 2 is arithmetically determined on the basis of the detected depression depth or actuation level $\alpha$ of the accelerator pedal 7. The arithmetic operation for determining the throttle opening $\theta_s$ can be performed in accordance with a function $\theta_s = f(\alpha, N_e)$ (where $N_e$ represents the engine rotation speed) which has previously been established and stored in a memory incorporated in the controller 10. The relation between the accelerator pedal depression depth $\alpha$ and the desired throttle valve opening degree $\theta_s$ may differ in dependence on maneuvering performances or characteristics to be imparted to the motor vehicle. FIG. 8 graphically illustrates a typical one of such relations. Referring to this figure, a characteristic curve a in solid line indicates that the throttle opening degree $\theta_s$ is changed substantially linearly in proportion to the depression depth $\alpha$ of the accelerator pedal. In contrast, in the case represented by a characteristic curve b, the throttle valve opening degree $\theta_s$ is so controlled as to change gently in a range within which the accelerator pedal depression $\alpha$ remains small. With the maneuvering characteristic represented by the curve b, it is contemplated to cope with such problems that shock is likely to occur in the motor vehicle, making difficult the optimum control of the engine, when the intake air flow changes rapidly or steeply upon starting of the vehicle or in the course of running at a low speed.

On the other hand, FIG. 9 graphically shows relations between the engine output torque and the engine rotation speed (rpm). As can be seen from a broken-line curve labeled "ENGINE TORQUE", the output torque of the engine does not bear a linear relationship to the engine rotation speed (rpm). More specifically, in low- and high-speed ranges, the engine output torque tends to become low. In this conjunction, it is to be mentioned that the above-mentioned dependence of the engine output torque on the engine rotation speed ranges can be improved by correcting the relation represented by the curve b shown in FIG. 8 with correcting coefficients represented by a solid-line curve shown in FIG. 9 and labeled "CORRECTING COEFFICIENTS".

At this juncture, it should also be mentioned that the control characteristic of the throttle opening degree $\theta_s$ relative to the accelerator pedal depression $\alpha$ described above is only for the purpose of illustration. In reality, such control characteristics may vary in dependence on the desired maneuverability, comfortableness in driving the motor vehicle and/or other factors as well as performances of the engine.

After having determined the desired throttle opening degree $\theta_s$ as mentioned above, the processing proceeds to a step S73 (FIG. 7) in which a real or actual throttle opening degree $\theta_r$ is fetched from the output of the throttle position sensor 6, which is then followed by a step S74 where a deviation or difference e between the desired throttle opening degree $\theta_s$ and the real throttle opening degree $\theta_r$ is arithmetically determined. When the real throttle opening degree $\theta_r$ is smaller than the desired throttle opening $\theta_s$, the throttle valve 2 is driven in the direction to increase the throttle opening $\theta_r$ on the basis of the deviation e through the throttle actuator 3 (step S75). If otherwise, the throttle valve 2 is driven in the direction to decrease the throttle opening $\theta_r$ through the throttle actuator 3 (step S76).

By controlling or regulating the opening degree of the throttle valve 2 through the electrical throttle actuator 3 in this manner, a high controllability of the engine operation and hence a high maneuverability of the motor vehicle can be realized. Besides, by feeding back a vehicle speed signal to the controller 10 to be taken into account in controlling the throttle valve 2, it is possible to effectuate a cruising-speed (constant speed) drive of the motor vehicle.

However, in contrast to the conventional mechanical control of the throttle valve in which the opening degree thereof is controlled by the accelerator pedal through the medium of a mechanical linkage, the electrical control of the throttle valve 2 described above is susceptible to a problem that the throttle valve 2 becomes inoperative, when a failure occurs in the throttle actuator 3, the controller 10 or other components taking parts in the electrical control of the throttle valve 2, which may lead to uncontrollable running of the motor vehicle. Accordingly, it is very important to fail-safe the electrical control of the throttle valve.

FIG. 10 is a flow chart for illustrating, by way of example, a procedure for making decision as to occurrence of abnormality in the control system for the throttle valve 2 inclusive of the throttle actuator 3 and measures taken in dependence on the results of the abnormality decision.

Referring to FIG. 10, in a step S101, there are determined the depression $\alpha$ of the accelerator pedal 7, the real opening degree $\theta_r$ of the throttle valve and the deviation or difference $\beta$ therebetween. The relation between the quantities $\alpha$ and $\theta_r$ can be given by a predetermined function, as described above. So long as the relation given by this function is maintained normal, there can not make appearance the difference $\beta$ of such magnitude which exceeds a predetermined value $\beta_1$ (Step S102). Thus, it can be decided that the real throttle opening $\theta_r$ is abnormal when the above-mentioned difference $\beta$ exceeds the predetermined value $\beta_1$.

When the difference or deviation $\beta$ is greater than the preset value $\beta_1$, electric power supply to the throttle actuator 3 is interrupted (Step S103) to thereby stop the operation of the throttle actuator 3, because, if otherwise, there arises possibility of uncontrollable running of the motor vehicle due to the abnormality occurring in the throttle valve or in the control system therefor. When operation of the throttle actuator 3 is disabled, the throttle valve 2 is resiliently urged to move to the fully closed position under the effort of the return spring 5. On the other hand, when the difference $\beta$ is smaller than the predetermined value $\beta_1$ inclusive thereof, it is decided that the throttle control system inclusive of the throttle actuator 3 is normal (step S104).

However, there may arise such situation that the throttle valve 2 is not moved to the fully closed position even when the operation of the throttle actuator 3 is stopped, because of a frictional engagement in a reduction gear train incorporated in the throttle actuator 3. To deal with this problem, it is known to dispose an electromagnetic clutch (not shown) between the shaft 4 of the throttle valve 2 and the throttle actuator 3 and disconnect the former from the latter by deenergizing the electromagnetic clutch upon occurrence of abnormality in the throttle valve control system to thereby allow the throttle valve 2 to assume the fully closed position under the effort of the return spring 5. Further, when a failure takes place in operation for opening the throttle valve 2, fuel injection to all or some of the engine cylinders may be interrupted to thereby lower the engine output torque. Alternatively, an ignition timing may be delayed to the substantially same effect.

On the other hand, when a failure occurs in the fully closed state of the throttle valve 2 (i.e., when the throttle valve 2 can not be opened from the fully closed position), the engine operation stops spontaneously to inhibit the motor vehicle from further running. As the measures for solving this problem, it can be conceived to mechanically couple the throttle valve 2 to the accelerator pedal 7 through manual operation or to provide throttle actuator systems in duplicate with one in redundancy.

As is apparent from the foregoing description, in the conventional power train control system for the motor vehicle, the throttle actuator control can certainly be fail-safed against failure in the fully opened position of the throttle valve (i.e., failure incurring uncontrollable running of the motor vehicle). However, for the failure occurring in the fully closed position of the throttle valve (i.e., failure disabling the running of the motor vehicle), there is no remedy method which can be adopted practically and profitably from the standpoint of economy and manipulation. It goes without saying that the disability of running the motor vehicle due to such failure will incur unwanted situation in dependence on the place where the motor vehicle is driven. For example, in the course of driving the motor vehicle on an expressway, this sort of failure should be excluded positively.

SUMMARY OF THE INVENTION

In the light of the state of the art described above, it is an object of the present invention to provide a power train control system for an internal combustion engine of a motor vehicle which can prevent the uncontrollable running of a motor vehicle even upon occurrence of abnormality in the throttle control system inclusive of the throttle actuator at the fully closed position as well as at the fully opened position of the throttle valve.

Another object of the present invention is to provide a power train control system for a motor vehicle which can afford a backup operation over a limited range of engine output torques for protecting the engine output torque from being excessively lowered even upon occurrence of abnormality in the throttle control system to thereby ensure acceleration and uphill running performances of the motor vehicle.

In view of the above and other objects which will become apparent as description proceeds, there is provided according to an aspect of the invention a power train control system for an internal combustion engine of a motor vehicle, which system comprises a throttle valve control means for electrically controlling opening of a throttle valve in response to an accelerator actuation signal indicative of actuation level of an accelerator pedal, a backup control means for controlling an auxiliary intake air flow which bypasses the throttle valve upon occurrence of abnormality in the throttle valve control means in accordance with the accelerator pedal actuation signal.

According to a second aspect of the invention, it is proposed that the power train control system described above further include a transmission control means for changing a speed-range shift pattern of an automatic transmission to a low gear ratio during operation of the backup control means.

With the structure of the power train control system for the motor vehicle according to the present invention, a bypass control valve provided in an air flow passage which bypasses the intake air pipe across the throttle valve is operated in linkage with actuation or depression of an accelerator pedal upon occurrence of failure in the throttle valve control system in the fully closed position of the throttle valve. At the same time, the speed range shift pattern of the automatic transmission for transmitting the output torque of the engine to driving wheels may be changed to a lower gear ratio in order to sustain desired performances of the motor vehicle even though the engine output torque is limited. Thus, the engine and hence the motor vehicle can continuously be operated even upon occurrence of failure in the throttle valve control system in the fully closed state of the throttle valve.

The above and other objects, features and attendant advantages of the invention will better be understood by reading the following description of preferred embodiments thereof taken in conjunction with the drawings.

DESCRIPTION OF THE PREFERRED EMBODIMENTS

Now, the present invention will be described in detail in conjunction with preferred or exemplary embodiments thereof by reference to the drawings.

Figure 1:
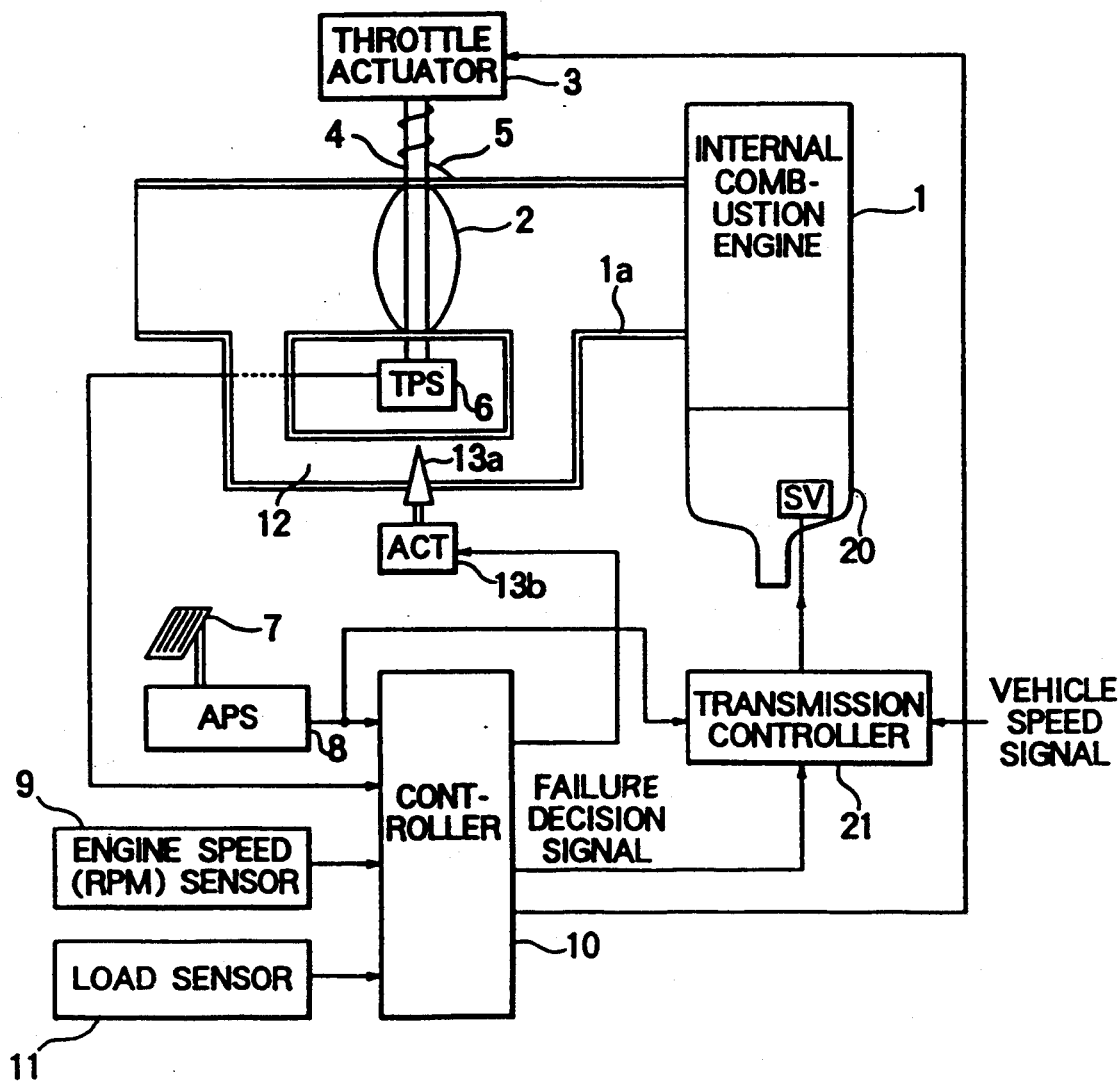
FIG. 1 is a block diagram showing generally a system of a power train control system for an internal combustion engine system of a motor vehicle according to an embodiment of the present invention.
Figure 6:
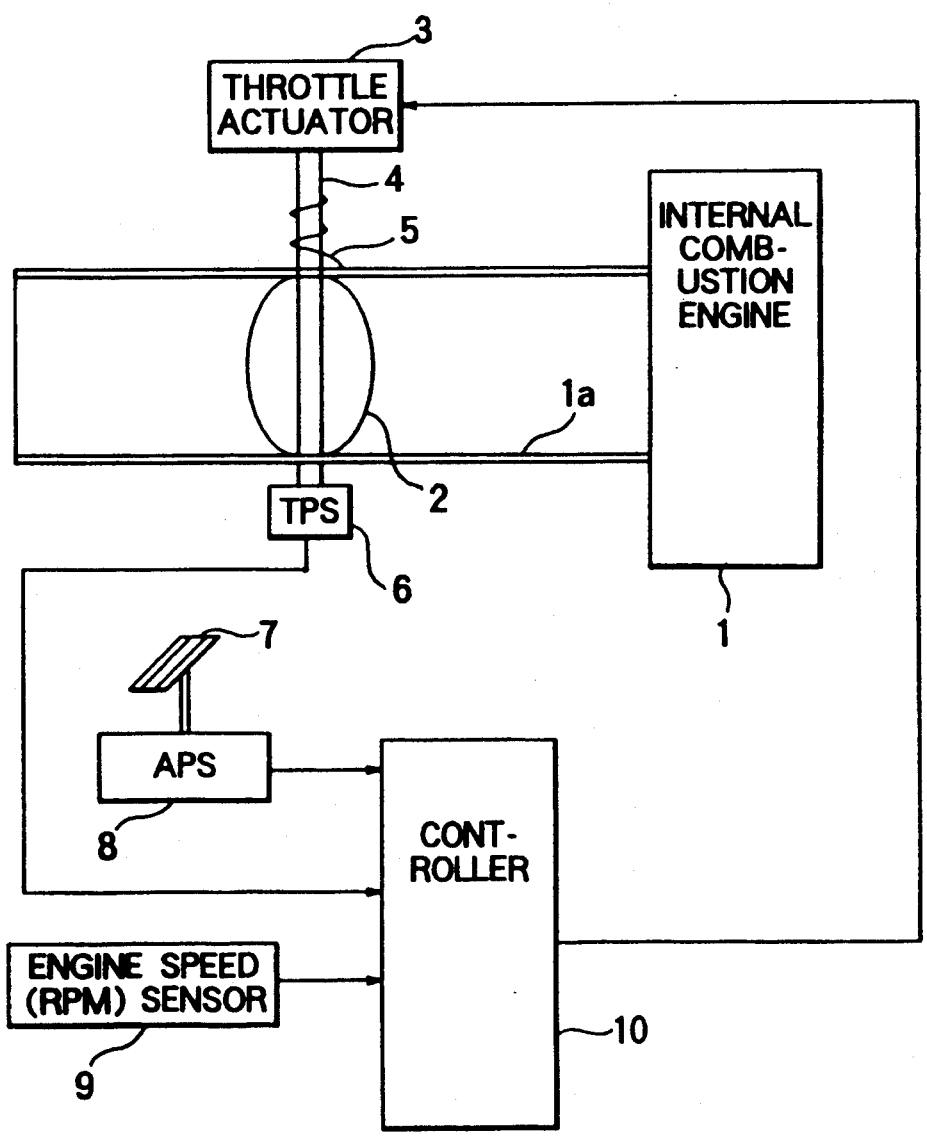
FIG. 6 is a block diagram showing schematically a structure of a power train control system for a motor vehicle known heretofore.

FIG. 1 is a block diagram showing generally a structure of a power train control system for an internal combustion engine of a motor vehicle according to an embodiment of the invention. In this figure, the components which are same as or equivalent to those shown in FIG. 6 are denoted by like reference numerals and repeated description thereof is omitted. The power train control system according to the instant embodiment of the invention differs from the conventional one shown in FIG. 6 in that there are additionally provided load sensors 11 (only one of which is shown) for generating signals representative of load states of engine make-up machines such as an air conditioner, a power steering system, various electric apparatuses and the like, a bypass passage 12 which is so provided as to bypass the intake pipe 1a at a location where the throttle valve 2 is disposed, a bypass control valve 13a for controlling the air flow in the bypass passage 12, an actuator 13b for the bypass control valve 13a, an automatic transmission 20 and a transmission controller 21 therefor. As the automatic transmission 20, any type of conventional automatic transmission may be employed so far as the speed range shift control can be realized electrically. Since such automatic transmission is known in the art, description thereof will be unnecessary.

Figure 7:
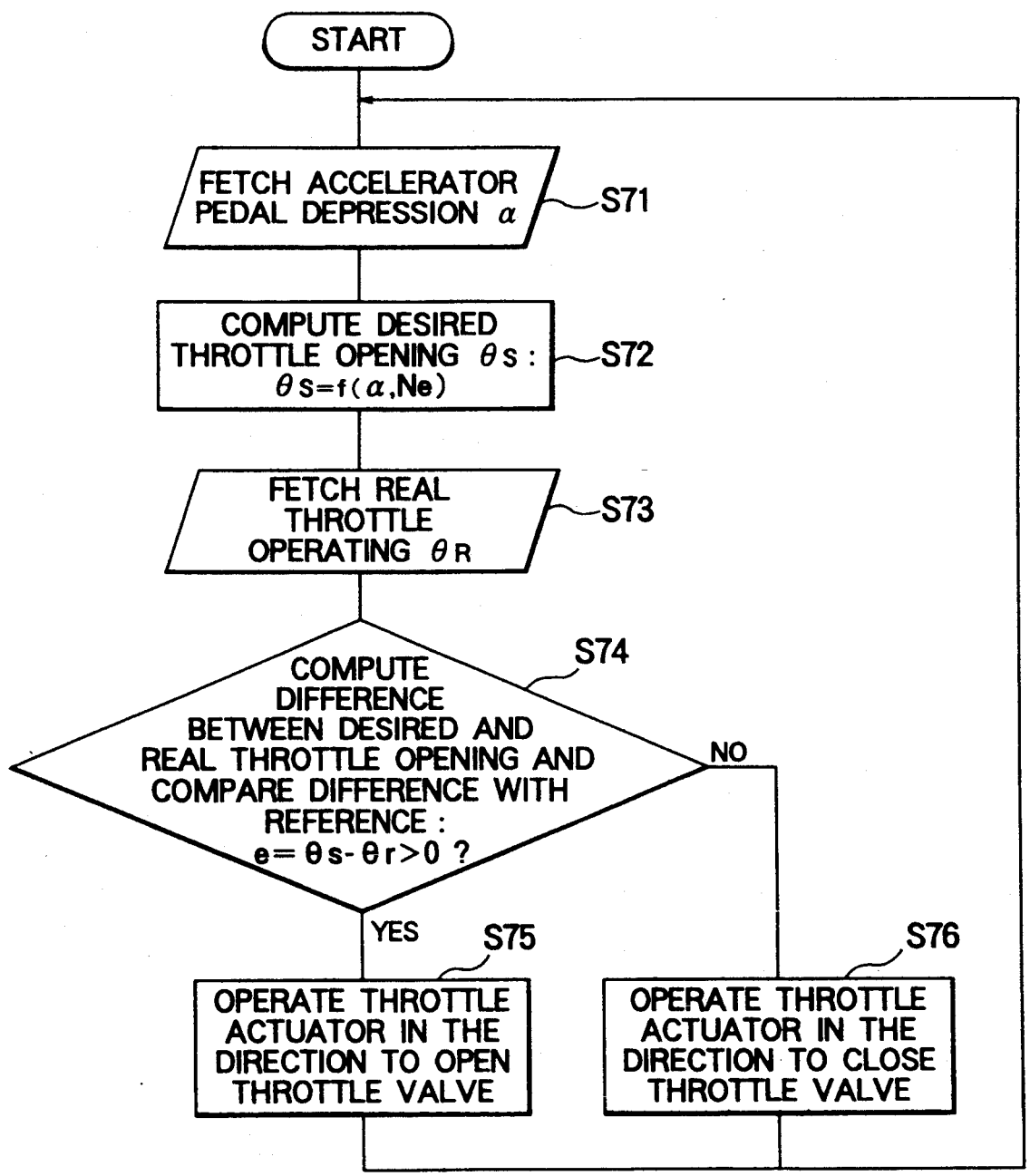
FIG. 7 is a flow chart for illustrating a procedure for controlling a throttle valve through the power train control system shown in FIG. 6.
Figure 8:
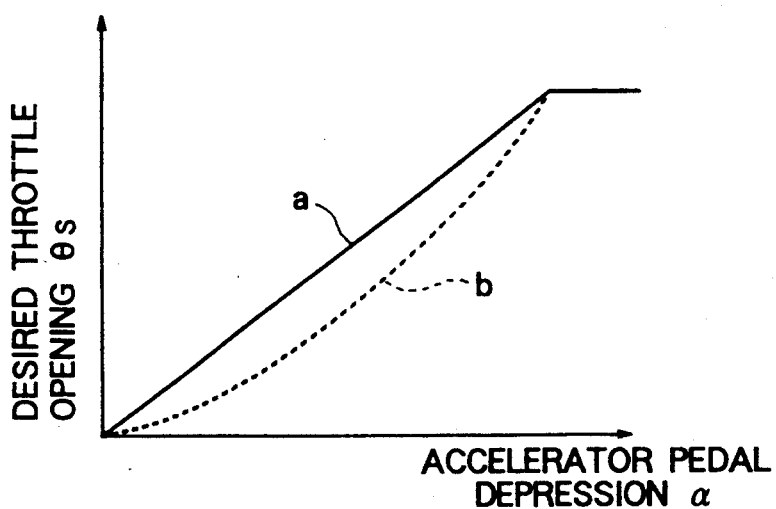
FIG. 8 is a view for illustrating graphically typical relations between throttle opening and accelerator pedal depression.
Figure 9:
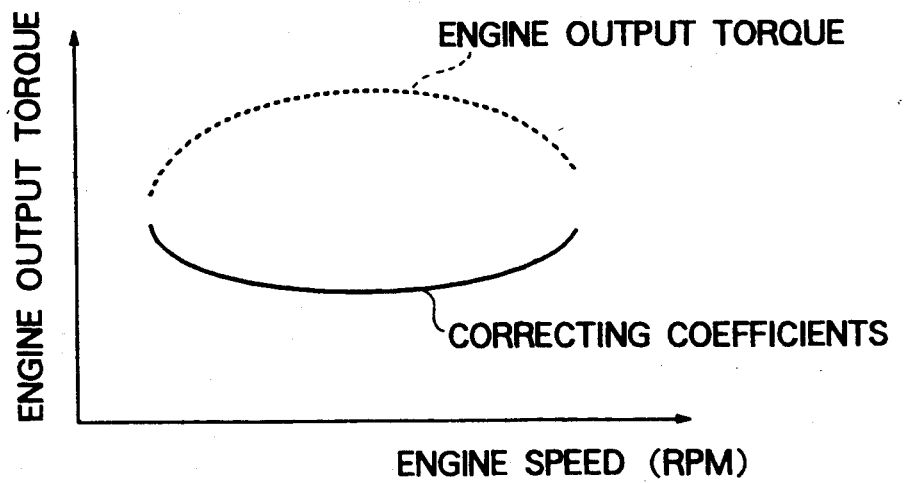
FIG. 9 is a view for illustrating graphically relations between engine output torque and engine rotation speed.
Figure 10:
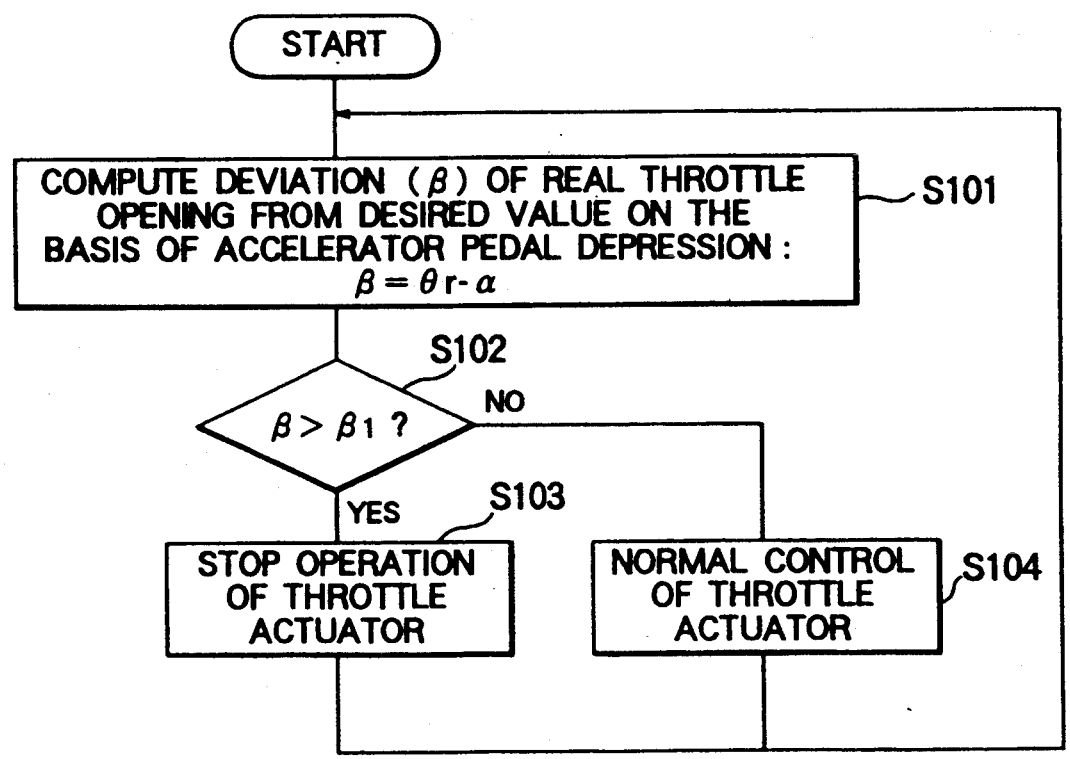
FIG. 10 is a flow chart for illustrating a procedure for making decision as to occurrence of abnormality in a throttle control system and the measures taken in dependence on the results of the abnormality decision.

With the structure of the power train control system described above, the control of the throttle actuator 3 is performed through a substantially same procedure as that described hereinbefore in conjunction with the flow chart shown in FIG. 7 (i.e., as in the case of the power train control system known heretofore). However, in the case of the power train control system according to the instant embodiment of the invention, the bypass passage 12 is additionally provided, wherein the air flow through the bypass passage 12 is controlled by the bypass control valve 13a via the actuator (ACT) 13b.

Parenthetically, it is to be mentioned that provision of a bypass control valve unit in a bypass passage for the purpose of controlling the idling speed (rpm) of the engine is known and adopted in practical applications. Basic operation of such bypass air flow control unit is to control the opening of the bypass control valve in an open loop in dependence on the load states of the engine make-up machines mentioned previously while realizing a feedback control of the engine speed (rpm) so that it assumes constantly a predetermined level or value (cruising speed level) when the throttle valve 2 is fully closed (i.e., when the accelerator pedal is released). Since these control operations are also known in the art, detailed description thereof will be unnecessary.

Figure 2:
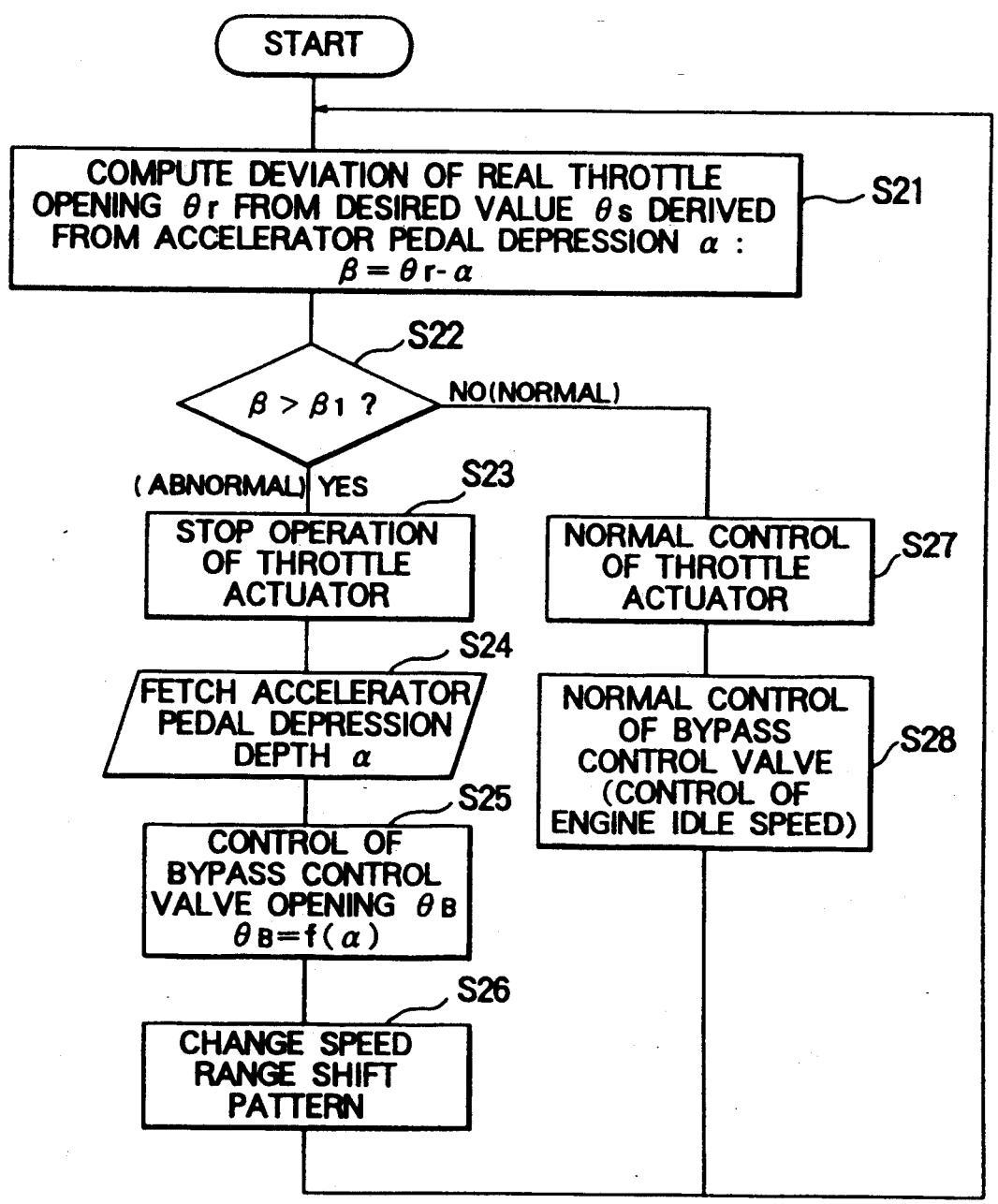
FIG. 2 is a flow chart for illustrating operation of the power train control system according to the invention.

With the present invention, it is contemplated to validate fail-safe operation as well as backup operation of the engine and hence the motor vehicle, when abnormality takes place in the throttle valve 2, the throttle actuator 3 and/or the control system therefor when the throttle valve is in the fully closed position. This will be described below by reference to a flow chart shown in FIG. 2.

In a step S21, deviation $\beta$ of the real opening degree $\theta_r$ of the throttle valve 3 from a desired value which is determined on the basis of the accelerator pedal depression $\alpha$ is arithmetically determined, which is then followed by an abnormality decision step S22, as in the case of the hitherto known system described hereinbefore by reference to FIG. 7. Further, a step S23 where operation of the throttle actuator 3 is invalidated when the decision in the step S22 results in abnormality (Y), a step S27 where the throttle actuator 3 is placed under the normal or ordinary control when the decision step S22 results in normality (N) and a step S28 where the ordinary control of the bypass control valve unit 13a;13b is effected for the purpose of the idle speed control are same as those adopted in the conventional power train control system.

Figure 3:
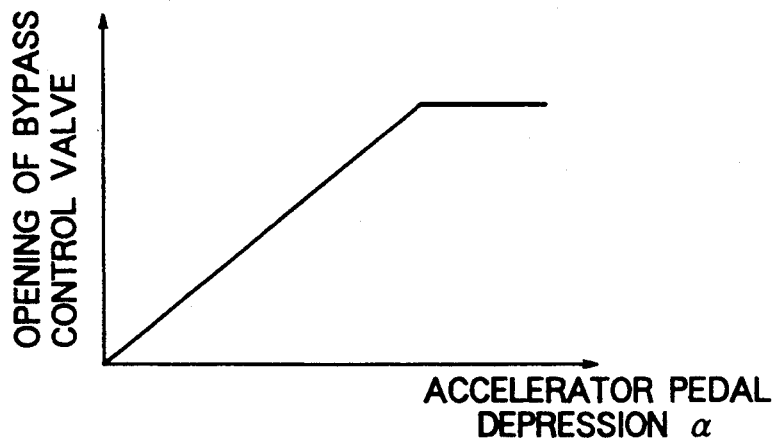
FIG. 3 is a characteristic diagram showing a relation between opening of a bypass control valve and depression of an accelerator pedal.

According to the teachings of the present invention, the accelerator pedal depression $\alpha$ is fetched in a step S24 after operation of the throttle actuator 3 has been stopped upon occurrence of failure in the fully closed state of the throttle valve, whereon the opening $\theta_B$ of the bypass control valve 13a is controlled as a function of the accelerator pedal depression $\alpha$ in a step S25 in such a manner as illustrated graphically in FIG. 3.

It goes without saying that so far as the throttle control system remains normal, the opening of the bypass control valve 13a is controlled as a function of the load states of the engine make-up machines independently of actuation or depression of the accelerator pedal 7 under the control of the controller 10.

In consideration of the fact that when the bypass air flow is small, the running performance of the motor vehicle can not satisfactorily be assured by the backup operation performed by using the bypass passage 12 upon occurrence of failure in the throttle control system inclusive of the throttle actuator 3 in the fully closed state of the throttle valve 2, the flow section of the bypass passage 12 should be so selected that the amount of the bypass air flow is sufficient for the idling speed of the engine after the warming-up to attain a predetermined value, for example, of 2000 rpm at the least.

Figure 4:
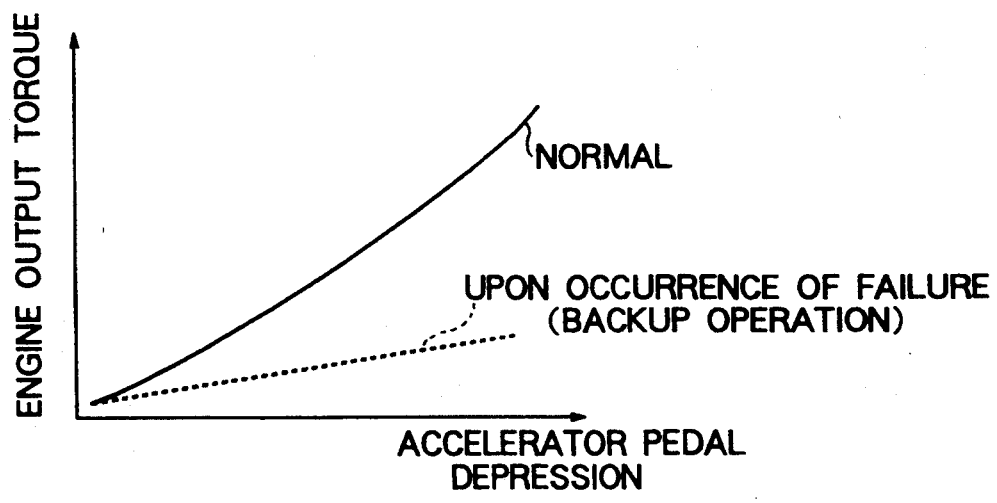
FIG. 4 is a characteristic diagram showing relations between engine output torque and depression of an accelerator pedal in normal operation and backup operation, respectively.

In the backup operation effected with the aid of the bypass control valve 13a;13b, the engine output torque decreases significantly when compared with that in the normal operation, as can be seen from FIG. 4. As a consequence, the running performances of the motor vehicle such as acceleration performance, uphill running performance and the like tends to become inadequate. With the aim for mitigating such inconvenience, it is also proposed by the invention that when decision is made by the controller 10 that the throttle valve control system including the throttle actuator 3 suffers a failure, the controller 10 sends a signal indicating the failure (failure decision signal) to the transmission controller 21, whereby the speed range shift pattern of the automatic transmission 20 is changed to a lower gear ratio by the transmission controller 21 in a step S26.

Figure 5:
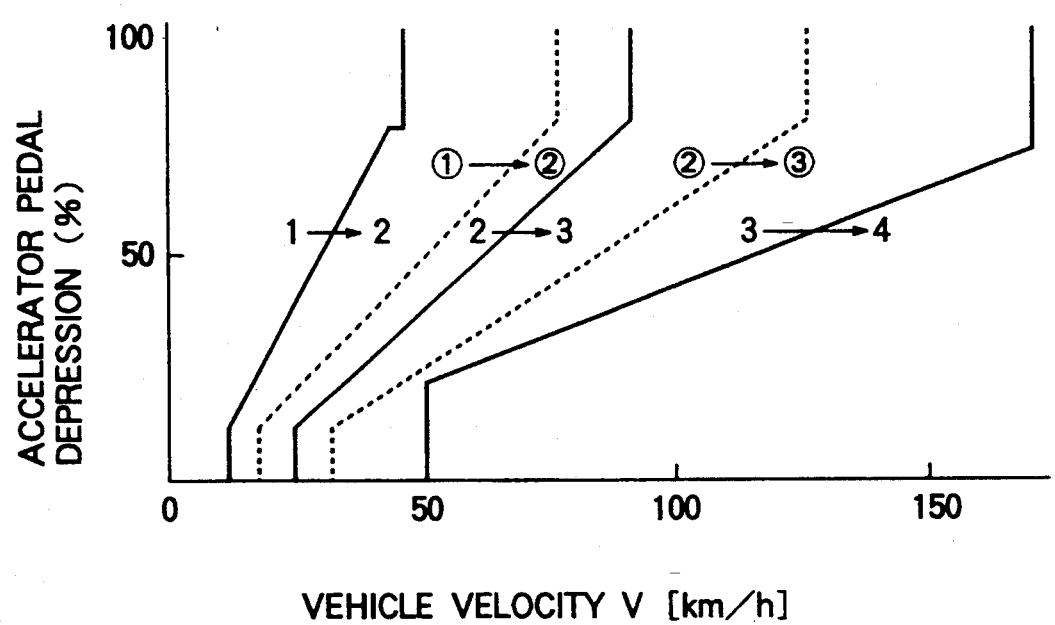
FIG. 5 is a view for graphically illustrating a speed range shift pattern changing operation performed in the backup operation.

A method of changing the speed range shift pattern is illustrated in FIG. 5. In this figure, solid line curves represent a speed change pattern in the normal operation of the engine system, while broken line curves represent a speed range shift pattern in the backup operation. As can be seen from FIG. 5, the motor vehicle is caused to run during the backup operation at a lower gear ratio for a same vehicle speed when compared with the normal operation. By way of example, in the backup operation, the speed range shift pattern is modified such that the second speed range in the normal operation is changed to the first speed range with the third speed range in the normal operation being changed to the second speed range and so forth. In this manner, the transmission controller 21 responds to the failure decision signal issued by the controller 10 to thereby change the speed range shift pattern of the transmission 20 to the backup operation oriented speed range shift pattern from the normal operation oriented speed range shift pattern. To this end, the transmission controller 21 determines a speed range shift pattern change point on the basis of the vehicle speed signal and the accelerator pedal depression signal to thereby change over correspondingly a plurality of hydraulic pressure control solenoid valves (not shown) incorporated in the automatic transmission 20.

Many features and advantages of the present invention are apparent form the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

I claim:

1. A power train control system for an internal combustion engine system of a motor vehicle, comprising:
   throttle valve control means for electrically controlling an opening degree of a throttle valve in response to an accelerator actuation signal indicative of an actuation level of an accelerator means;
   backup control means for controlling an auxiliary air flow which bypasses said throttle valve upon an occurrence of abnormality in said throttle valve control means in accordance with said accelerator actuation signal; and
   transmission control means for shifting a speed change pattern of an automatic transmission to a lower gear ratio during a backup operation under the control of said backup control means when compared with that of normal operation.

2. A control system for an internal combustion engine of a motor vehicle, comprising:
   a throttle valve disposed within an air intake pipe of said engine for regulating an air flow fed to said engine;
   electrical throttle actuator means for operating said throttle valve;
   a controller for controlling said electrical throttle actuator means to thereby control an opening of said throttle valve in dependence on an actuation level of an accelerator pedal of said motor vehicle;
   an auxiliary air flow passage bypassing said air intake pipe at a location where said throttle valve is disposed;
   auxiliary air-flow regulating valve means for controlling an air flow through said auxiliary air flow passage; and
   throttle position sensor means for generating a signal indicating the position of said throttle valve;
   wherein said controller includes:
   decision means for making a decision as to an occurrence of an abnormality in one of said throttle valve, said throttle actuator means, and a control system therefor in a fully closed position of said throttle valve on the basis of the signal supplied from said throttle position sensor; and control means responsive to an abnormality signal issued by said decision means for activating and controlling said auxiliary air flow regulating means in dependence on the actuation level of said accelerator pedal to thereby allow intake air flow to be supplied to said engine through said auxiliary air flow passage under the control of said auxiliary air-flow regulating valve means;

wherein said motor vehicle is equipped with an automatic transmission, and further comprising:

transmission control means responsive to said abnormality signal to change a speed range shift pattern of said automatic transmission from a normal operation oriented speed range shift pattern to a backup operation oriented speed range shift pattern upon activation of said auxiliary air-flow regulating valve means.

3. A control system for an internal combustion engine of a motor vehicle according to claim 2, wherein gear ratio of said automatic transmission for said backup operation oriented speed range shift pattern is set lower than that for said normal operation oriented speed range shift pattern.

4. A control system according to claim 2, wherein said auxiliary air flow passage is constituted by a bypass air flow passage which is used for idling operation of said engine for warming-up thereof.

* * * * *